United States Patent
Bennett et al.

(10) Patent No.: US 7,886,177 B2
(45) Date of Patent: Feb. 8, 2011

(54) METHOD AND APPARATUS OF COLLECTING TIMER TICKS

(75) Inventors: Joseph A. Bennett, Roseville, CA (US); Jeffrey R. Wilcox, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 11/616,667

(22) Filed: Dec. 27, 2006

(65) Prior Publication Data

US 2008/0162976 A1    Jul. 3, 2008

(51) Int. Cl.
*G06F 1/00* (2006.01)
*G06F 19/00* (2006.01)
*G06F 13/24* (2006.01)
*G04F 1/00* (2006.01)

(52) U.S. Cl. .............. 713/502; 713/300; 702/89; 702/176; 710/260

(58) Field of Classification Search .......... 713/502, 713/300; 702/89, 176; 710/260
See application file for complete search history.

(56) References Cited

U.S. PATENT DOCUMENTS

| | | | | |
|---|---|---|---|---|
| 5,708,814 A * | 1/1998 | Short et al. | ................. | 710/260 |
| 6,115,779 A * | 9/2000 | Haubursin et al. | .......... | 710/262 |
| 6,543,000 B1 * | 4/2003 | Wright | .................. | 713/500 |
| 7,191,098 B1 * | 3/2007 | Brenner | ................ | 702/186 |
| 7,461,283 B2 * | 12/2008 | Andrianov | ................ | 713/500 |

* cited by examiner

*Primary Examiner*—Stefan Stoynov
(74) *Attorney, Agent, or Firm*—Blakely, Sokoloff, Taylor & Zafman LLP

(57) ABSTRACT

Described within is a power management system for a computing platform that provides additional reductions in power consumption from that provided by only periodically putting the CPU or peripheral devices in low power non-operational states. In particular, the embodiment prevents the OS from generating an interrupt due to timer ticks while in a non-C0 state, until such time as a number of timer ticks have been gathered.

12 Claims, 3 Drawing Sheets

METHOD AND APPARATUS OF COLLECTING TIMER TICKS

BACKGROUND INFORMATION

Power consumption is an important issue in computing platforms, especially in mobile platforms such as notebook computers and handheld devices which operate with a battery power supply. In most mobile computing platforms today, the processor is well power managed by periodic power cycling. The majority of other subsystems in the platform (e.g., devices, chipsets, memory, and clocks), however, are usually constrained to remain in a state of readiness even while the processor is powered down, due to the unpredictability of device interrupts and bus master traffic.

For example, an operating system (OS) may awaken a sleeping processor before its scheduled wakeup time due to expiration of the OS timer. The OS timer ticks awaken sleeping processors at a fixed interval even if there is no bus activity. These factors limit the opportunities for effectively reducing power consumption by needlessly waking up a sleeping processor.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

CROSS DEVICE PCI CONFIGURATION ALIGNMENT

Current computer systems contain various components such as chipsets, CPUs, memory, memory controller, network controllers, etc. These components are connected together through various buses. One such bus may be a PCI (Peripheral Component Interconnect) bus. BIOS (Basic Input Output System) software provides basic input output functions for the computer system.

Within the chipset of the computer system there are several PCI devices. Many registers within these devices are the same and only need to change when a part changes due to different OEMs. Registers such as a "subsystem vendor ID", which contains fields which uniquely identify the add-in board or subsystem where the PCI device resides, must be updated by BIOS when booting and coming out of resume, since these values are unique to the platform.

Currently, this is performed by each device in the chipset having a write-once register that BIOS must update with the value. Reflecting the contents of one register in another register is known as shadowing. One register is a shadow register, whose data is shadowed by one or more shadowing registers. One way to shadow a register is to perform bus write operations to every shadow register when the shadowed register is updated with new data. A drawback to shadowing is that it can be time consuming when there are a lot of integrated devices in a chipset since all the registers have to be updated when a value of a register changes. Additionally, the amount of time it takes to update ID bits becomes unnecessarily burdensome.

Figure 1:
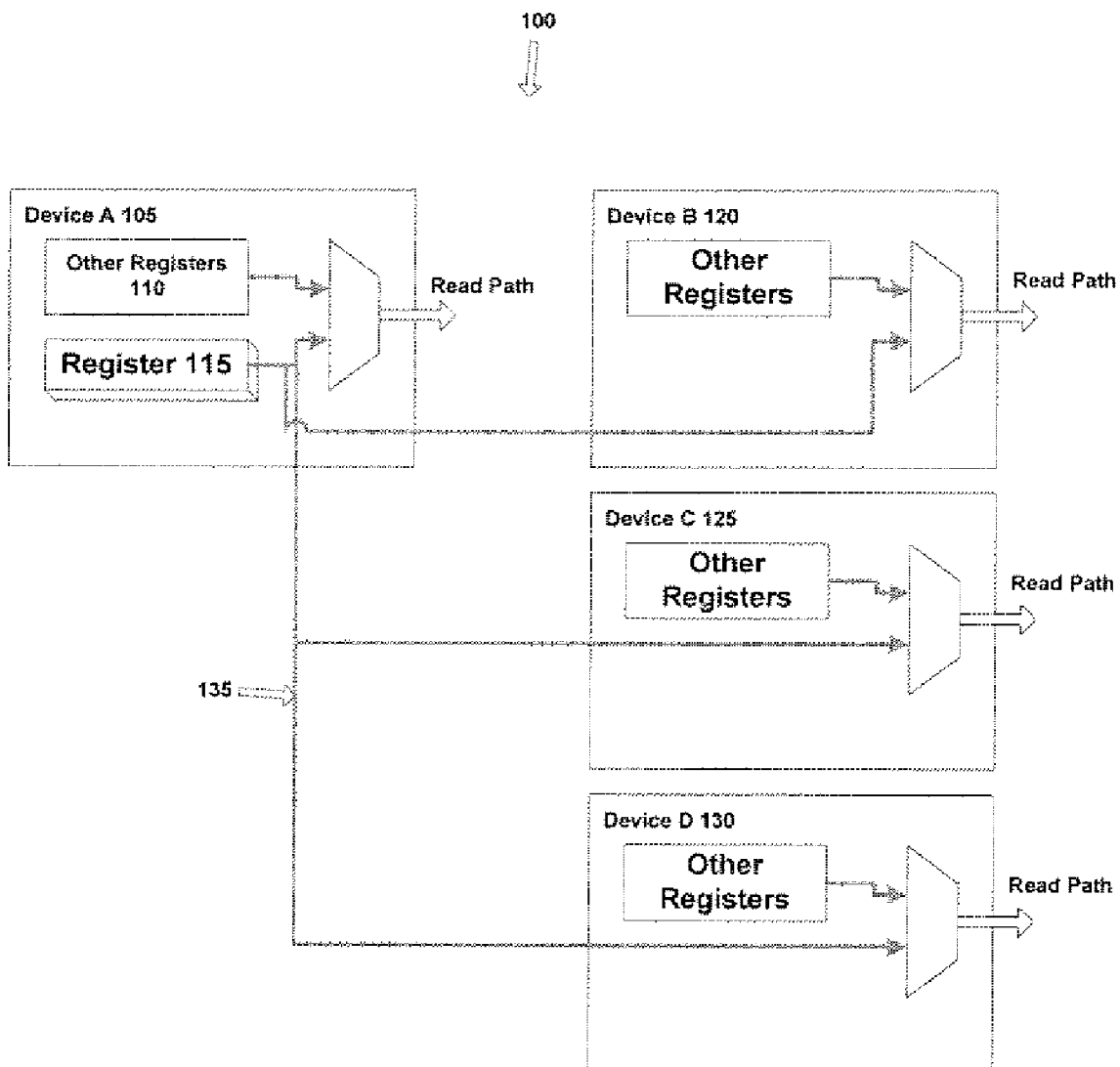
FIG. 1 illustrates a circuit diagram of an apparatus with a single shared write-once register in a legacy bridge.

FIG. 1 is a circuit diagram of an apparatus 100 of a single shared write-once register in a legacy bridge. Device A maybe a legacy block 105 that may contains various registers 110. The device A 105 also contains a single register 115 that may be a write-once register. A computer system may update the register 115 with a new value. Once the register 115 is updated, this updated value may be sent to every other PCI device in the system (device B 120, device C 125 and device D 130). It should be noted that the number of devices may vary depending on implementation of the system.

The output of the write-once register 115 is routed out of the legacy block 105 and is used by every other device 120, 125, 130, in the system. In one such system the registers may be connected to each other via a side-band bus 135 that flows throughout the chipset and to which all components are connected.

The computer system now has a messaging scheme where only one write-once register 115 is necessary. This allows the BIOS to improve its run time since only one register needs to be update. This new register 115 in the legacy block 105 is able to notify every other register in the system of its new value.

Advantageously, the apparatus 100 identifies key registers that are important to software, such that the software overhead of maintaining values in these registers may be reduced. The apparatus 100 is also able to reduce the amount of gates needed.

Computing Timer Ticks

A computing platform is a framework that supports the components necessary to form an operational computing system such as may be implemented, for example, in a laptop or other type of computer, cell phone, or personal data assistant. As such, a computing platform may or may not include a processor (a.k.a., a central processing unit or CPU), a disk drive or other storage device for storing system software, or the system software executed by the CPU.

The platform also incorporates power management logic 160 for implementing the power management schemes to be described below. The power management logic may be implemented in various ways (e.g., in the case of a motherboard platform as part of the core chipset) and portions of it may be incorporated into device controllers. In various embodiments, the power management logic defines time intervals during which a device and/or other platform components commit to certain types of inactivity and thus present opportunities for power management. Power management logic may also have connections to a clock generation and interrupt circuitry by which it may affect the operation of those components.

Computing platforms typically incorporate some sort of power management scheme which power cycles the processor by waking the processor from a low power non-operational state at periodic wakeup intervals with an interrupt. Such schemes are especially important for mobile platforms such as laptop computers which operate on battery power. For example, the Advanced Configuration and Power Interface Specification (referred to herein as the ACPI specification) explicitly calls out CPU power states, or C-states: the C0 state represents the working power of the CPU and the Cx states where x represents low power idle states where the higher number represents a state with lower power and higher recovery latency.

The periodic wakeup intervals for the processor are usually specified by the operating system (OS) being run by the platform and are therefore also referred to as OS tick intervals, the lengths of which are typically 10-15 ms (e.g., 10 ms for Microsoft Windows XP 0 and 14 ms for Microsoft Windows 95®. The C-states of the processor are entered every OS tick interval. The platform has a timer which generates an OS tick interrupt which wakes the CPU from an idle low power state Cx, and the OS scheduler then selects a number of tasks to execute while the CPU is active. When the pending tasks are finished, the CPU enters the low power state again until the next scheduled wakeup interrupt or until another type of interrupt occurs which wakes the CPU before the scheduled wakeup.

Ideally a system should be in low power mode as long as possible to conserve power. However, with timer ticks having periodic wakeup intervals, even when the system has no activity, is a waste of power. If there is no activity then the system should be able stay in idle mode for as long as possible without waking up every 14 ms.

Described below is a power management system for a computing platform that provides additional reductions in power consumption from that provided by only periodically putting the CPU or peripheral devices in low power non-operational states. Although the description is set forth with reference to CPU and device states as defined in the ACPI specification, it should be appreciated that the power management system may also be incorporated into computing platforms that do not conform to the ACPI specification.

Figure 2:
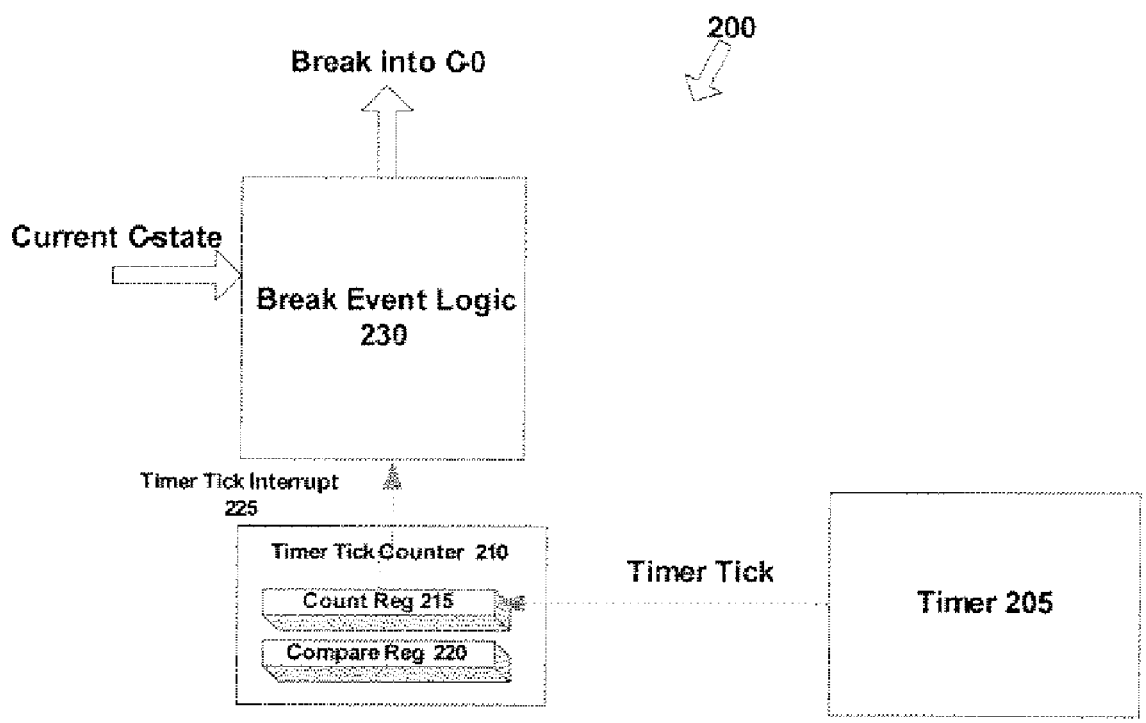
FIG. 2 illustrates a block diagram of a timer tick counter in accordance with an embodiment of the invention.

FIG. 2 is a block diagram of a timer tick counter in accordance with one embodiment. The embodiment of FIG. 2 prevents the OS from generating an interrupt due to timer ticks while in a non-C0 state, until such time as a number of timer ticks have been gathered. Initially, a system 200 has a timer 205 to generate timer ticks. The timer ticks are gathered by a timer tick counter 210. The timer tick counter 210 counts up 215 for each timer tick received. When the value in the register 215 matches a value in a compare register 220, a timer tick interrupt 225 is generated. The compare register 220 provides the platform with a different number of timer ticks to gather (say, 1, 2, 4, 16 . . . ). For example, if the number provided by the compare register 220 is 4, then the counter register 215 gathers 4 timer ticks and compares the number of ticks with the value in the compare register 220. When the number of timer ticks matches the number in the compare register 220, the timer tick interrupt 225 is generated.

Break event logic 230, upon receiving the timer tick interrupt 225, sends a series of interrupts (one for each collected timer tick) so that the OS may update its internal time. A timer tick interrupt needs to be sent for every timer tick collected because the OS uses the hardware timer to count time, and expects a timer tick interrupt every "n" milliseconds.

Once the timer tick interrupt 225 is generated, all the timer ticks that have been collected need to be sent to the interrupt controller, so that the OS, which was expecting a periodic timer tick in order to update its internal time value, will know to update the time value. If it only sees one tick (even though 4 were collected), it would only update the timer once, by the tick amount, thus losing time.

Figure 3:
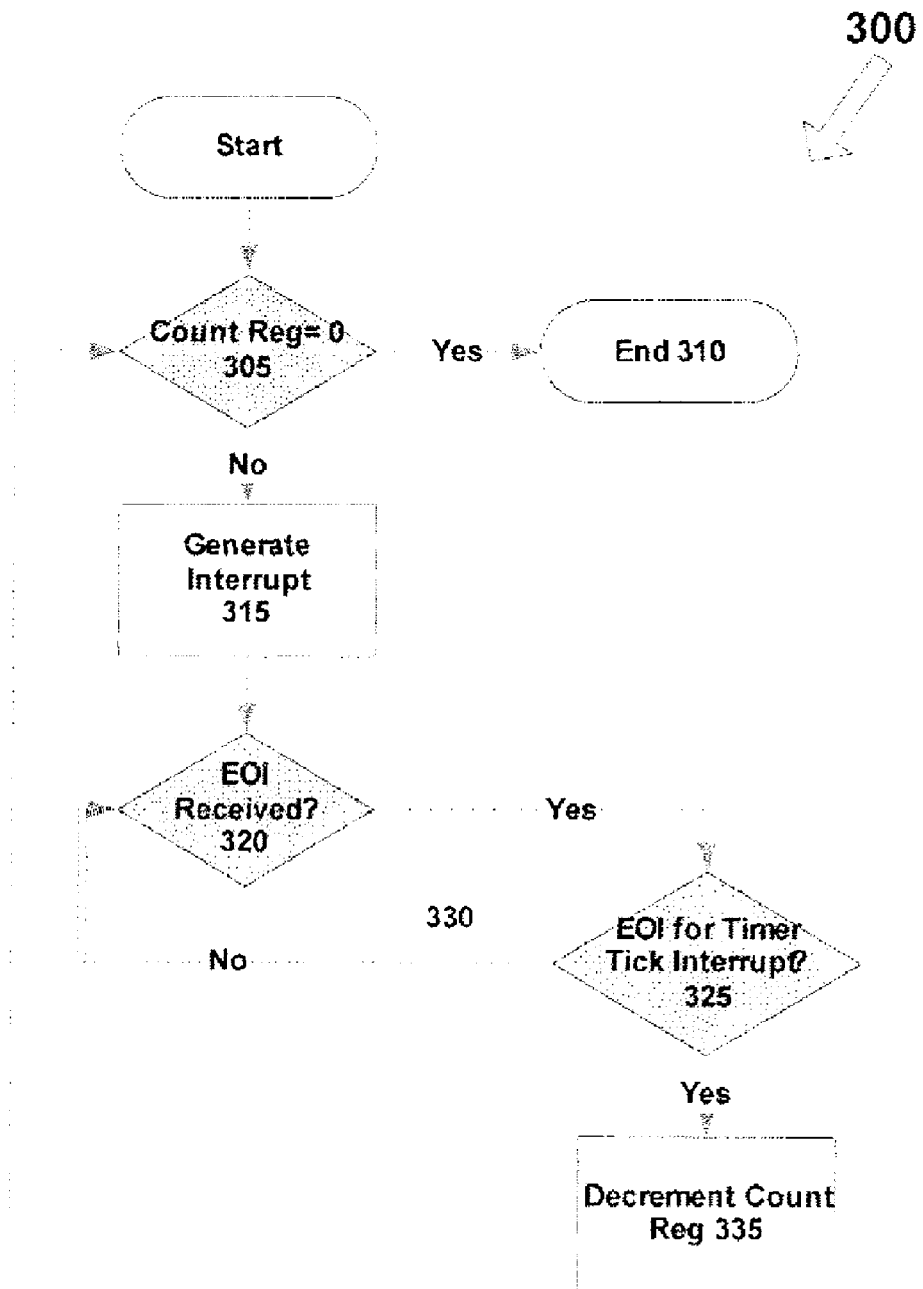
FIG. 3 is a flow chart of a timer tick counter in accordance with an embodiment of the invention.

FIG. 3 is a flow chart 300 of a timer tick counter in accordance with one embodiment. In particular, method 300 illustrates the how the system 200 counts down the count register 215 to enable an accurate number of timer tick interrupts.

Initially, the system determines if the count register 215 is equal to zero 305. If the value in the count register 215 is equal to zero then there are no timer tick gathered 310. However, if the value in the count register is a number other than zero the method moves to step 315.

In step 315, an interrupt is generated. Next, the system determines if an end of interrupt (EOI) has been received 320. If EOI has not been received, then the system keeps checking to see if EOI has been received.

If EOI has been received, the system checks for EOI for timer tick interrupt 325. If it is not the end of the EOI for the timer tick interrupt, the system continues to check for EOI received 330. However, if EOI for the timer tick interrupt has been received, then the count register 215 is decremented 335.

Once the counter 215 is decremented, the system determines if the count register is equal to zero. This enables the system to make sure the number of interrupts the OS is expecting to see stays consistent.

Advantageously, this helps increase platform idleness because, for the majority of timer ticks, the OS wakes up, realizes there is nothing to do, and then goes back to sleep. This invention will help decrease average power in mobile platforms with existing PC operating systems.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Also, in the description and claims, the term "coupled" and "connected", along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
generating timer ticks;
counting the generated timer ticks;
collecting a number of the generated timer ticks based on a value provided by a compare register;
generating a timer tick interrupt when the number of the generated timer ticks matches the value provided by the compare register;
sending the timer tick interrupt to an operating system based on the number of timer ticks collected.

2. The method of claim 1 wherein the value provided by the compare register includes a predetermined number.

3. The method of claim 2 further comprising generating interrupts for every timer tick collected.

4. The method of claim 3 further comprising determining the number of timer ticks collected.

5. The method of claim 4 further comprising determining if end of interrupt is received.

6. The method of claim 1, wherein the timer tick interrupt is received by the operating system, the operating system to update an internal timer value based on the received timer tick interrupt.

7. An apparatus comprising:
- a timer to generate timer ticks;
- a counter coupled to the timer, the counter to count the generated timer ticks;
- a register to collect a number of the generated timer ticks based on a value provided by a compare register;
- logic coupled to the counter, the logic to generate a timer tick interrupt when the number of the generated timer ticks matches the value provided by the compare register, and send the timer tick interrupt to an operating system based on the number of timer ticks collected.

8. The apparatus of claim 7, wherein the value provided by the compare register includes a predetermined number.

9. The apparatus of claim 7, wherein the timer tick interrupt is received by the operating system, the operating system to update an internal timer value based on the received timer tick interrupt.

10. A system comprising:
- a power management system, wherein the power management system comprises:
- a timer to generate timer ticks;
- a counter coupled to the timer, the counter to count the generated timer ticks;
- a register to collect a number of the generated timer ticks based on a value provided by a compare register;
- logic coupled to the counter, the logic to generate a timer tick interrupt when the number of the generated timer ticks matches the value provided by the compare register, and send the timer tick interrupt to an operating system based on the number of timer ticks collected.

11. The system of claim 10, wherein the value provided by the compare register includes a predetermined number.

12. The system of claim 10, wherein the timer tick interrupt is received by the operating system, the operating system to update an internal timer value based on the received timer tick interrupt.

* * * * *